(12) United States Patent
Lake et al.

(10) Patent No.: US 6,906,724 B2
(45) Date of Patent: Jun. 14, 2005

(54) GENERATING A SHADOW FOR A THREE-DIMENSIONAL MODEL

(75) Inventors: Adam T. Lake, Portland, OR (US); Carl S. Marshall, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 259 days.

(21) Appl. No.: 09/982,475

(22) Filed: Oct. 17, 2001

(65) Prior Publication Data

US 2003/0071822 A1 Apr. 17, 2003

(51) Int. Cl.$^7$ ............................................... G09G 5/02
(52) U.S. Cl. ......................................... 345/589; 345/621
(58) Field of Search ................................. 345/582–589, 345/607, 622, FOR 159; 382/174

(56) References Cited

U.S. PATENT DOCUMENTS

| | | |
|---|---|---|
| 4,600,919 A | 7/1986 | Stern |
| 4,747,052 A | 5/1988 | Hishinuma et al. .......... 250/587 |
| 4,835,712 A | 5/1989 | Drebin et al. ................ 345/423 |
| 4,855,934 A | 8/1989 | Robinson |
| 4,901,064 A | 2/1990 | Deering |
| 5,124,914 A | 6/1992 | Grangeat |
| 5,163,126 A | 11/1992 | Einkauf et al. |
| 5,371,778 A | 12/1994 | Yanof et al. .................... 378/4 |
| 5,611,030 A | 3/1997 | Stokes |
| 5,731,819 A | 3/1998 | Gagne et al. |
| 5,757,321 A | 5/1998 | Billyard |
| 5,786,822 A | 7/1998 | Sakaibara |
| 5,805,782 A | 9/1998 | Foran |
| 5,809,219 A | 9/1998 | Pearce et al. |
| 5,812,141 A | 9/1998 | Kamen et al. |
| 5,847,712 A | 12/1998 | Salesin et al. |
| 5,894,308 A | 4/1999 | Isaacs |
| 5,929,860 A | 7/1999 | Hoppe |
| 5,933,148 A | 8/1999 | Oka et al. |
| 5,949,969 A | 9/1999 | Suzuoki et al. |
| 5,966,133 A | 10/1999 | Hoppe |
| 5,966,134 A | 10/1999 | Arias |
| 5,974,423 A | 10/1999 | Margolin |
| 6,054,999 A * | 4/2000 | Strandberg ................... 345/474 |
| 6,057,859 A | 5/2000 | Handelman et al. |
| 6,078,331 A | 6/2000 | Pulli et al. |
| 6,115,050 A | 9/2000 | Landau et al. |
| 6,175,655 B1 | 1/2001 | George et al. ............... 382/257 |
| 6,191,787 B1 | 2/2001 | Lu et al. |
| 6,191,796 B1 | 2/2001 | Tarr |
| 6,198,486 B1 | 3/2001 | Junkins et al. |
| 6,201,549 B1 | 3/2001 | Bronskill |
| 6,208,347 B1 | 3/2001 | Migdal |
| 6,219,070 B1 | 4/2001 | Baker et al. |
| 6,239,808 B1 | 5/2001 | Kirk et al. |
| 6,252,608 B1 | 6/2001 | Snyder et al. ............... 345/473 |

(Continued)

OTHER PUBLICATIONS

Jane Wilhelms and Allen Van Gelder, University of California, Santa Cruz, [online], 1997 [retrieved Jun. 28, 2004]. Retrieved from the Internet:<URL: http://graphics.stanford-.edu/courses/cs448–01–spring/papers/wilhelms.pdf>.*

Foley et al., "Computer graphics: principal and practice" Addison–Wesley Publishing Company, 1060–1064, Reading, MA 1996.

(Continued)

*Primary Examiner*—Matthew C. Bella
*Assistant Examiner*—G. F. Cunningham
(74) *Attorney, Agent, or Firm*—Fish & Richardson P.C.

(57) ABSTRACT

A shadow for a three-dimensional model having an infrastructure that includes a bone is generated by projecting the bone onto a surface and generating the shadow on the surface based on a projection of the bone. Projecting the bone includes drawing lines from the virtual light source, through points on the bone, onto the surface and connecting points at which the lines intersect the surface.

30 Claims, 10 Drawing Sheets

U.S. PATENT DOCUMENTS

| | | | |
|---|---|---|---|
| 6,262,737 | B1 | 7/2001 | Li et al. |
| 6,262,739 | B1 | 7/2001 | Migdal et al. |
| 6,292,192 | B1 | 9/2001 | Moreton |
| 6,317,125 | B1 | 11/2001 | Persson |
| 6,337,880 | B1 | 1/2002 | Cornog et al. |
| 6,388,670 | B2 | 5/2002 | Naka et al. |
| 6,405,071 | B1 | 6/2002 | Analoui .................... 600/425 |
| 6,437,782 | B1 | 8/2002 | Pieragostini et al. ....... 345/426 |
| 6,478,680 | B1 | 11/2002 | Yoshioka et al. |
| 6,559,848 | B2 | 5/2003 | O'Rourke |
| 6,593,924 | B1 | 7/2003 | Lake et al. |
| 6,593,927 | B2 | 7/2003 | Horowitz et al. |
| 6,608,627 | B1 | 8/2003 | Marshall et al. |
| 6,608,628 | B1 | 8/2003 | Ross et al. .................. 345/619 |
| 2001/0024326 | A1 | 9/2001 | Nakamura et al. .......... 359/618 |
| 2001/0026278 | A1 | 10/2001 | Arai et al. |
| 2002/0061194 | A1 | 5/2002 | Wu et al. .................... 396/324 |
| 2002/0101421 | A1 | 8/2002 | Pallister |
| 2003/0011619 | A1 | 1/2003 | Jacobs et al. ............... 345/619 |

OTHER PUBLICATIONS

Hoppe, "Progressive Meshes" Microsoft Research, 99–108, http://www.research.microsft.com/research/graphics/hoppe/.

Popovic "Progressive Simplicial Complexes" Microsoft Research, http://www.research.microsft.com/~hoppe/.

Hoppe "Efficent Implementation of progressive meshes" Coput. & Graphics vol. 22, No. 1, pp. 27–36, 1998.

Taubin et al., "Progressive Forest Spilt Compression" IBM T. J. Watson Research Center, Yorktown Heights, NY.

Cohen–Or et al., "Progressive Compression of Arbitrary Triangular Meshes" Computer Science Department, School of Mathematical Sciences, Tel Aviv, Israel.

Bajaj et al., "Progressive Compression and Transmission of Arbitrary Triangular Meshes" Department of Computer Sciences, University of Texas at Austin, Austin, TX.

Pajarola et al., "Compressed Progressive Meshes" Graphics, Visualization & Usability Center, College of Computing, Georgia Institute of Technology, Jan. 1999.

Alliez et al., "Progressive Compression for Lossless Transmission of Triangle Meshes" University of Southern California, Los Angeles, CA, 195–202.

Chow "Optimized Geometry Compression for Real–time Rendering" Massachusetts Institute of Technology, Proceedings Visualization 1997, Oct. 19–24, Phoenix, AZ, 347–354.

Markosian "Real–Time Nonphotorealistic Rendering" Brown University site of the NSF Science and Technology Center for Computer Graphics and Scientific Visualization, Providence, RI.

Elber Line Art Rendering via a Coverage of Isoperimetric Curves, IEEE Transactions on Visualization and Computer Graphics, vol. 1, Department of Computer Science, Technion, Israel Institute of Technology, Haifa, Israel, Sep. 1995.

Zeleznik et al., "SKETCH: An Interface for Sketching 3D Scenes" Brown University site of the NSF Science and Technology Center for Computer Graphics and Scientific Visualization, 1996.

Landsdown et al., "Expressive Rendering: A Review of Nonphotorealistic Techniques" IEEE Computer graphics and Applicatons, 29–37, 1995.

Raskar "Image Precision Silhouette Edges" University of North Carolina at Chapel Hill, Microsoft Research, 1999 Symposium on Interactive 3D Graphics Atlanta, GA, 135–231, 1999.

Ma et al., "Extracting Feature Lines for 3D Unstructured Grids" Institute for Computer Applications in Science and Engineering (ICASE), NASA Langley Research Center, Hampton, VA, IEEE, 1997.

Lewis "Pose Space Deformation: A Unified Approach to Shape Interpolation and Skeleton–Driven Deformation" Centropolis, New Orleans, LA, 165–172.

Lasseter "Principles of Traditional Animation Applied to 3D Computer Animation" Pixar, San Rafael, California, 1987.

Thomas (Contributor) et al., "The Illusion of Life: Disney Animation" 47–51.

Appel, Arthur, "The Notion of Quantitative Invisibility and the Machine Rendering of Solids." Proceedings of 22nd National Conference Association for Computing Machinery 1967.

Buck et al., "Performance–Driven Hand Drawn Animation", ACM (NPAR2000), pp. 101–108 (2000).

Catmull et al., "Recursively Generated B–Spline Surfaces on Arbitrary Topological Meshes," Computer Aided Design, 10(6):350–355 (1978).

Coelho et al., "An Algorithm for Intersecting and Trimming Parametric Meshes", ACM SIGGRAPH, pp. 1–8 (1998).

Deering, M., "Geometry Compression," Computer Graphics. SIGGRAPH '95, pp. 13–20, 1995.

DeRose et al., "Subdivisional Surfaces in Character Animation", ACM, SIGGRAPH'98, pp. 85–94 (1998).

Dyn, N. et al., "A Butterfly Subdivision Scheme for Surface Interpolation with Tension Control," ACM Transactions on Graphics, 9(2):160–169 (1990).

Elber, Gershon, "Interactive Line Art Rendering of Freeform Surfaces", Eurographics'99, 18(3):C1–C12 (1999).

Gooch et al., "A Non–Photorealistic Lighting Model for Automatic Technical Illustration," Computer Graphics Proceedings, Annual Conference Series, SIGGRAPH'98, pp. 447–452 (1998).

Gooch et al., "Interactive Technical Illustration," ACM Interactive 3D, pp. 31–38 (1999).

Heidrich et al., "Realistic, Hardware–Accelerated Shading and Lighting," ACM, (SIGGRAPH'99), pp. 171–178 (1999).

Hoppe, H., "Progressive Meshes," URL: http://www.research.microsft.com/research/graphics/hoppe/, (10 pgs.).

Kumar et al., "Interactive Display of Large Scale NURBS Models", ACM, Symp. On Interactive 3D Graphics, pp. 51–58 (1995).

Lake et al., "Stylized Rendering Techniques for Scalable Real–Time 3D Animation", NPAR, pp. 101–108 (2000).

Lander, Jeff, "Making Kine More Flexible, "Game Developer Magazine, 5 pgs., Nov. 1998.

Lander, Jeff, "Skin Them Bones," Game Developer Magazine, 4 pgs., May 1998.

Lee, M. et al., "Navigating Through Triangle Meshes Implemented as Linear Quadtrees," ACM Transactions on Graphics, 19(2):79–121 (2000).

Pedersen, "A Framework for Interactive Texturing on Curved Surfaces", ACM, pgs. 295–301 (1996).

"pmG Introduces Messiah: Animate 3.0", URL: http://www.digitalproducer.com/aHTM/Articles/july_2000/july_17_00/pmg_intros_messiah_animat e.thm (Accessed Oct. 26, 2004) 2 pgs.

Pueyo, X. et al., "Rendering Techniques '96," Proc. of Eurographics Rendering Workshop 1996, Eurographics, pgs. 61–70 (1996).

Rockwood, A. et al., "Real–time Rendering of Trimmed Surfaces," Computer Graphics (SIGGRAPH'89 Proceedings) 23:107–116 (1989).

Samet, Hanan, "Applications of Spatial Data Structures: Computer Graphics, Image Processing, and GIS," University of Maryland, Addison–Wesley Publishing Company, 1060–1064, Reading, MA, Jun. 1990.

Sousa, M., et al., "Computer–Generated Graphite Pencil Rendering of 3–D Polygonal Models", Eurographics'99, 18(3):C195–C207 (1999).

Stam, J., "Exact Evaluation of Catmull–Clark Subdivision Surfaces at Arbitrary Parameter Values", SIGGRAPH 98 Conference Proceedings, Annual Conference Series, pp. 395–404 (1998).

Taubin et al., "3D Geometry Compression", SIGGRAPH'98 Course Notes (1998).

Zorin "Interpolation Subdivision for Meshes With Arbitrary Topology" Department of Computer Science, California Institute of Technology, Pasadena, CA.

* cited by examiner

GENERATING A SHADOW FOR A THREE-DIMENSIONAL MODEL

TECHNICAL FIELD

This invention relates to generating a shadow for a three-dimensional (3D) model based on bones in the infrastructure of the 3D model.

BACKGROUND

A 3D model includes a virtual skeleton/infrastructure comprised of bones that are arranged in a hierarchical tree structure. Surrounding the bones is a polygon mesh, comprised of polygons such as triangles, which represents the skin of the 3D model. Movement of the polygon mesh is tied to the movement of the bones so that the 3D model approximates real-life movement when the bones are re-positioned.

The 3D model inhabits a virtual world, in which the distance to a virtual camera dictates perspective. A virtual light source, positioned in the environment of the virtual world, is used as a reference point for projecting shadows of the 3D model onto surfaces in the environment.

DESCRIPTION

Figure 1:
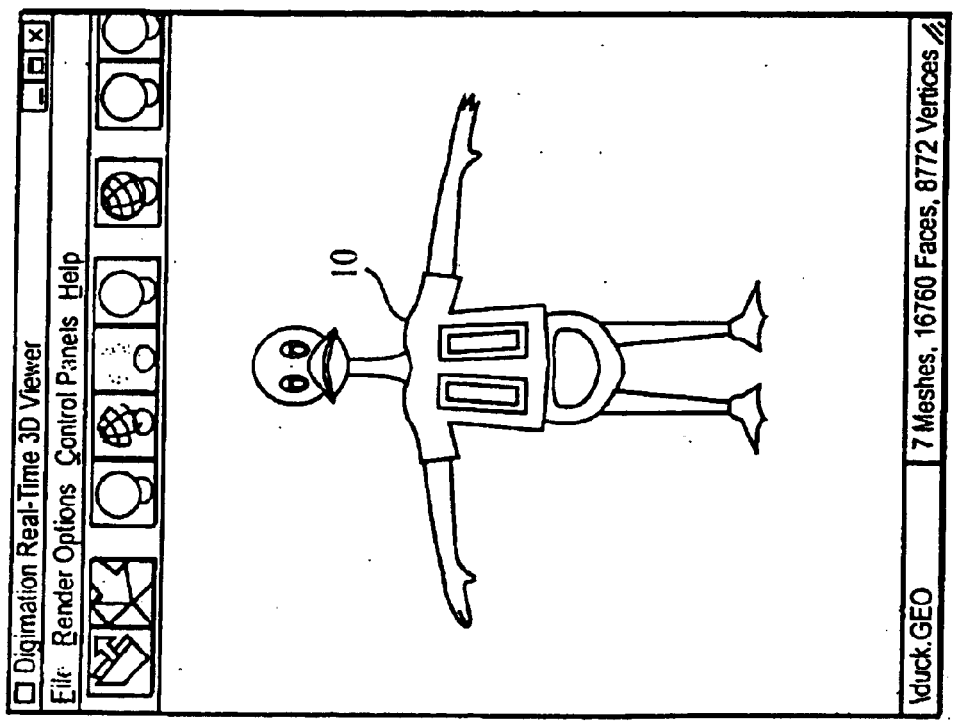
FIG. 1 is a view of a 3D model.

FIG. 1 shows a 3D model 10, which is rendered from 3D data. 3D model 10 is comprised of a polygon mesh (not shown). The polygons are triangles in this embodiment; however, other types of polygons may be used. The polygon mesh defines the "skin" surface of 3D model 10.

Figure 2:
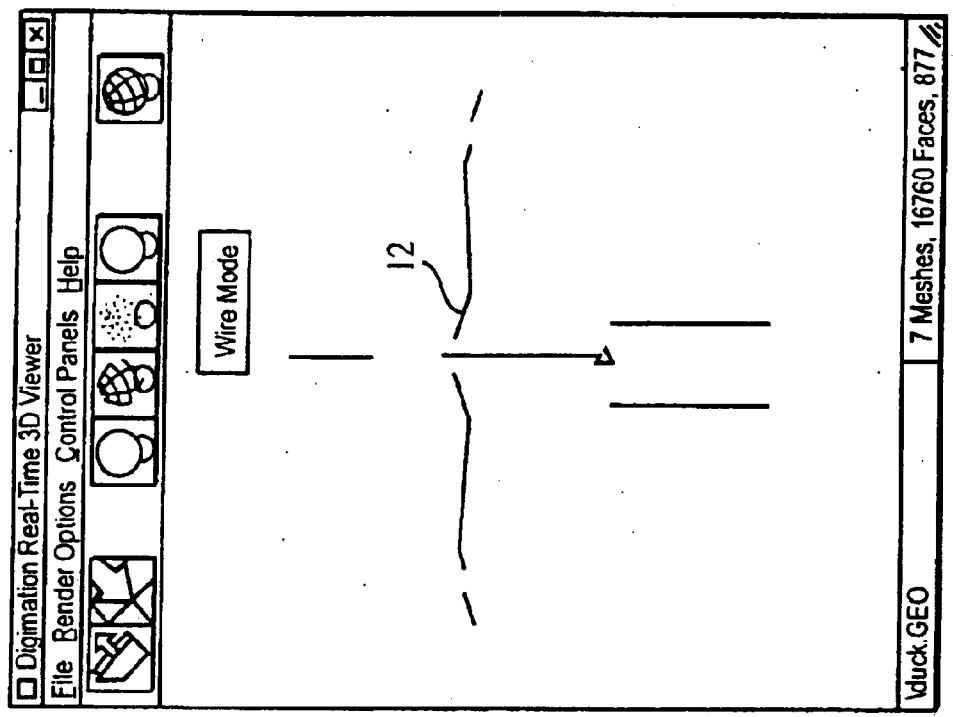
FIG. 2 is a view of bones in the 3D model of FIG. 1.

The 3D data for model 10 also includes bone data. The bone data defines a rigid infrastructure 12 of model 10 (FIG. 2). The infrastructure corresponds to the skeletal structure of a living being. In this embodiment, the "bones" that make up the infrastructure are Cartesian XYZ-space vectors.

Figure 3:
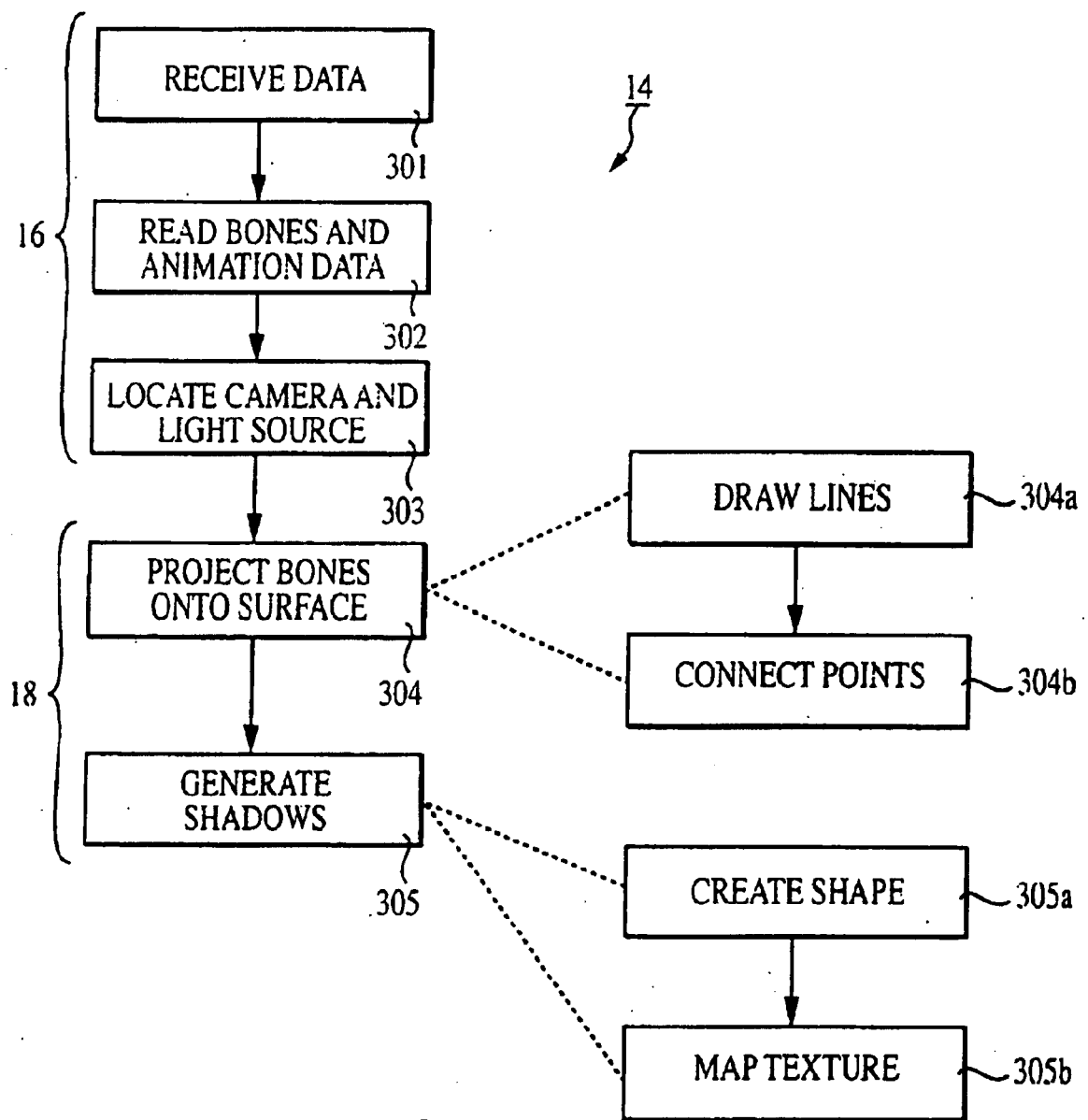
FIG. 3 is a flowchart showing a process for generating a shadow for the 3D model.

FIG. 3 shows a process 14 for generating shadows of 3D model 10 using its bones. Process 14 includes two phases: a pre-processing phase 16 and a run-time phase 18. Pre-processing phase 16 need not be repeated for each frame of 3D animation. That is, pre-processing phase 16 may be performed only once at the beginning of an animation sequence or, alternatively, it may be repeated as desired. Run-time phase 18, generally speaking, is repeated for each frame of animation, although this is not necessarily a requirement.

In pre-processing phase 16, process 14 receives (301) data that corresponds to the size and/or shape of a shadow to be generated. The data may be input by an animator (user) via a graphical user interface (GUI) (not shown) or the like.

Figure 4:
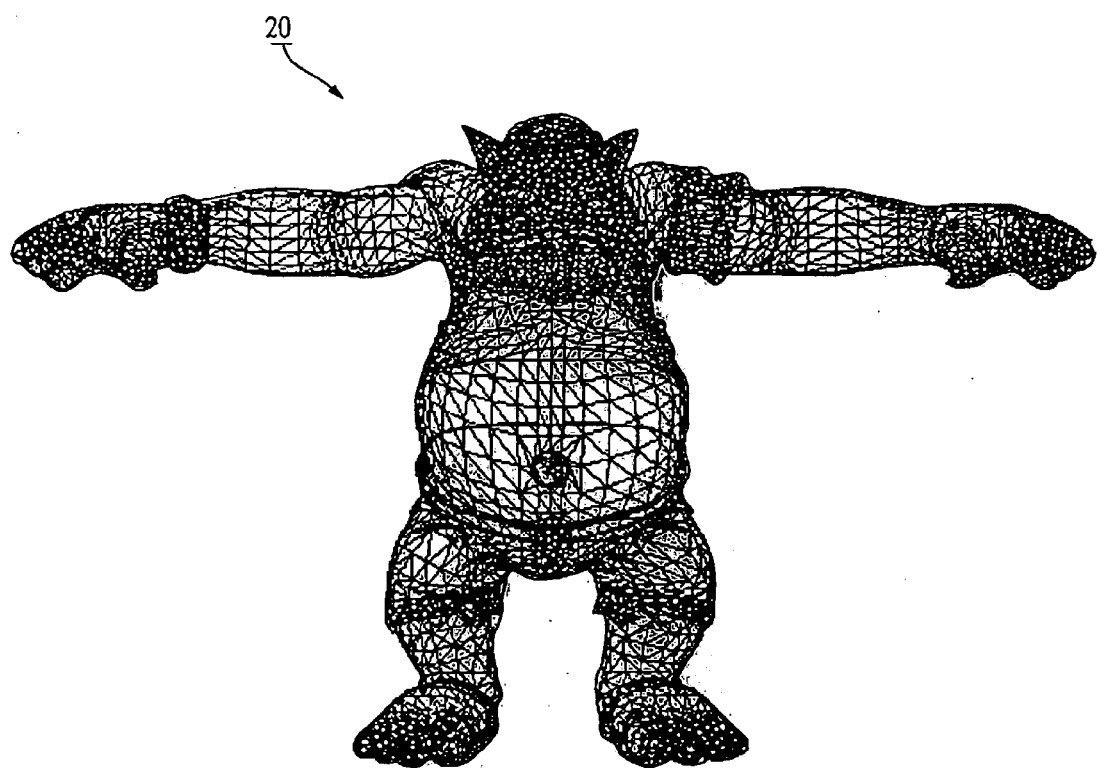
FIG. 4 is a view of a 3D model polygon mesh.
Figure 5:
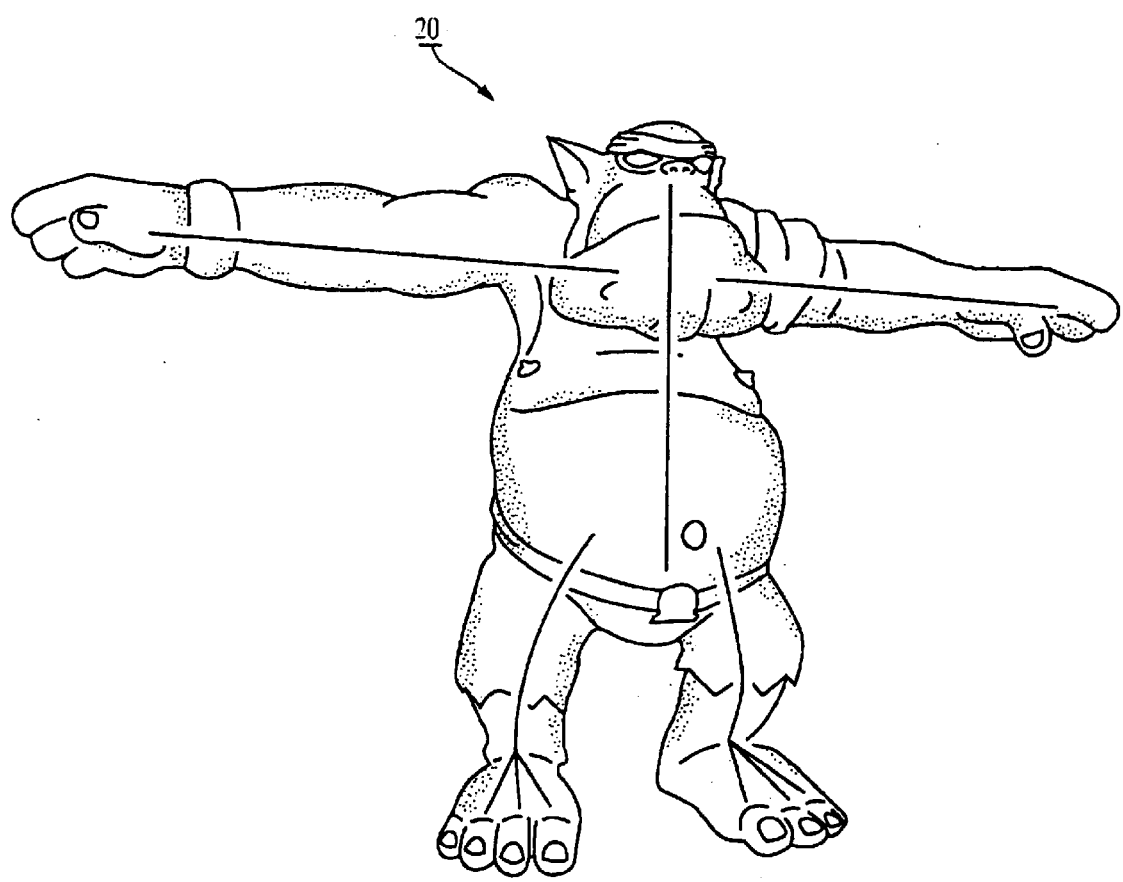
FIG. 5 is a view of bones in the 3D model of FIG. 4.

Process 14 reads (302) 3D data that defines the geometry of a frame of 3D animation. The 3D data may be read from a local memory, from a remote database via a network such as the Internet, or obtained from any other source. The data includes 3D data that defines a 3D model, including its polygon mesh (see, e.g., FIG. 4 for 3D model 20) and its bone structure (see, e.g., FIG. 5 for 3D model 20).

Figure 6:
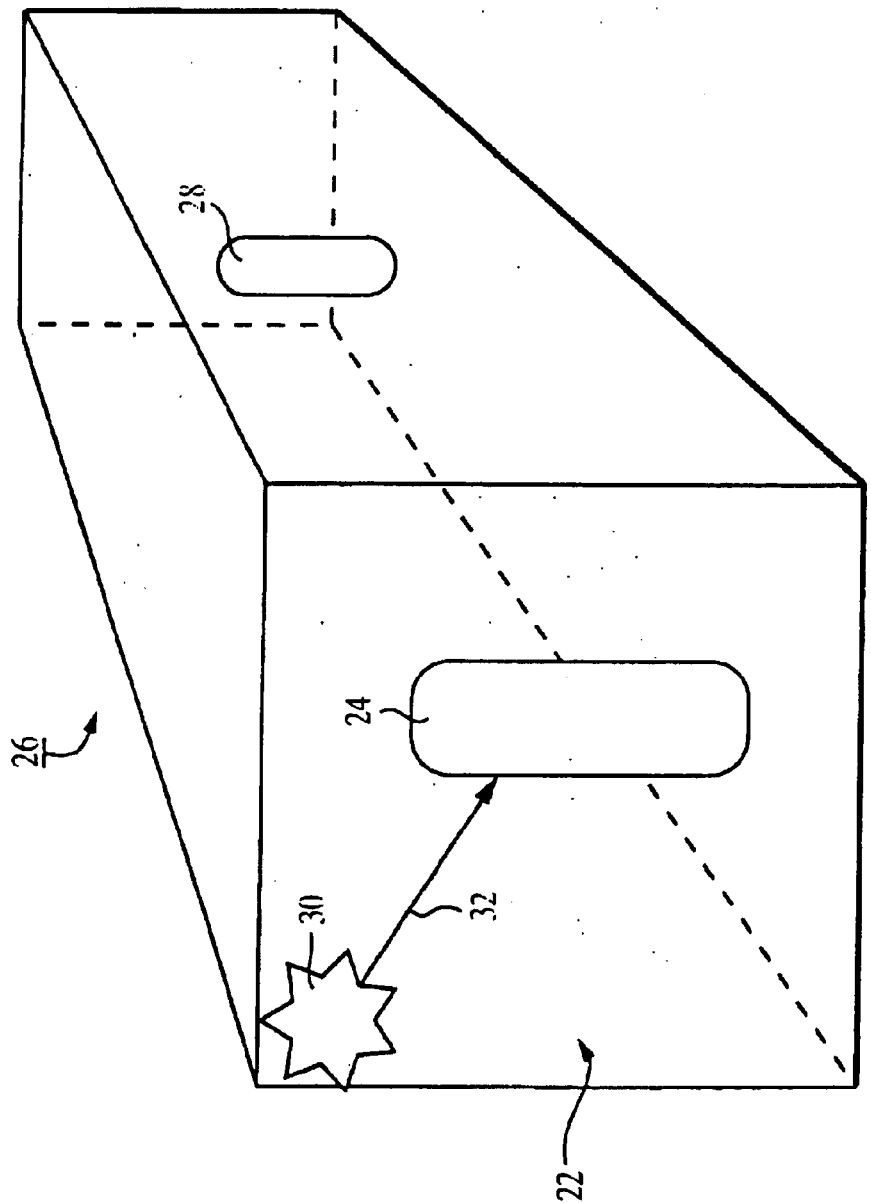
FIG. 6 is a perspective view of a 3D environment.

Process 14 locates (303) a virtual camera and virtual light source in the environment of the read frame of 3D animation. The location of a virtual camera defines a viewer's perspective for the frame of 3D animation. For example, in FIG. 6, the virtual camera is located at plane 22, making object 24 appear closer in 3D environment 26 than object 28. A virtual light source 30 is positioned within 3D environment 26 and defines how light hits objects in that environment. For example, as shown FIG. 6, a vector 32 corresponds to a ray of light from virtual light source 30, which affects the illumination of object 24.

Figure 7:
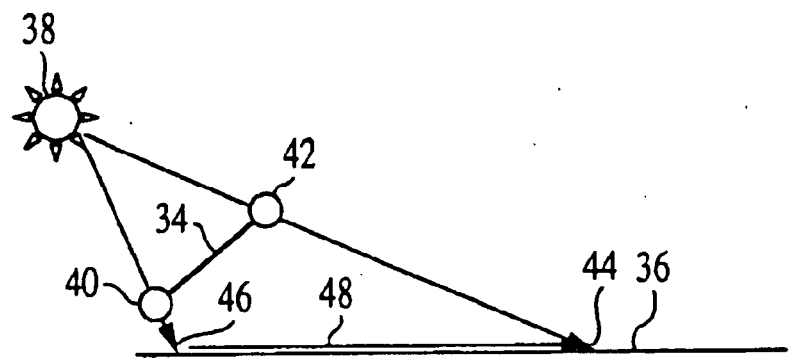
FIG. 7 is a block diagram showing projection of a bone onto a surface.

In FIG. 3, during run-time phase 18, process 14 identifies the bones infrastructure of a 3D model (e.g., 3D model 10 or 20) and, for each bone in the 3D model, proceeds as follows. Process 14 projects (304) the bone onto a surface in the 3D environment. FIG. 7 shows a bone 34 being projected onto a surface 36 in a 3D environment. In more detail, to project bone 34, process 14 draws (304a) lines (e.g., vectors) from virtual light source 38 through end points 40 and 42 of bone 34. These lines extend to surface 36, namely, to points 44 and 46 on surface 36, as shown in FIG. 7. Process 14 connects (304b) points 44 and 46 on surface 36, resulting in a projection 48 of bone 34 onto surface 36.

Process 14 generates (305) a shadow on surface 36 based on projection 48 of bone 34. Generating a shadow for each bone in a 3D model results in a shadow for the entire 3D model itself. It is noted that process 14 may not generate a shadow for every bone in a 3D model. For example, process 14 may generate shadows for only "major" bones in a 3D model, where major bones may be defined, e.g., by their length (bones that are greater than a predefined length) or proximity to the trunk/body of a 3D model (bones that are within a predefined number of bones from a predefined reference bone).

Process 14 generates the shadow based on the data received (301) in pre-processing phase 16. That is, the data defines the size and shape of the shadow. Process 14 therefore generates the shadow accordingly. This is done by creating (305a) a shape over at least part of projection 48 of the bone. The shape may be created, e.g., by growing a polygon from projection 48 (for the purposes of this application, the definition of "polygon" includes smooth-edged shapes, such as a circle, ellipse, etc.).

Figure 8:
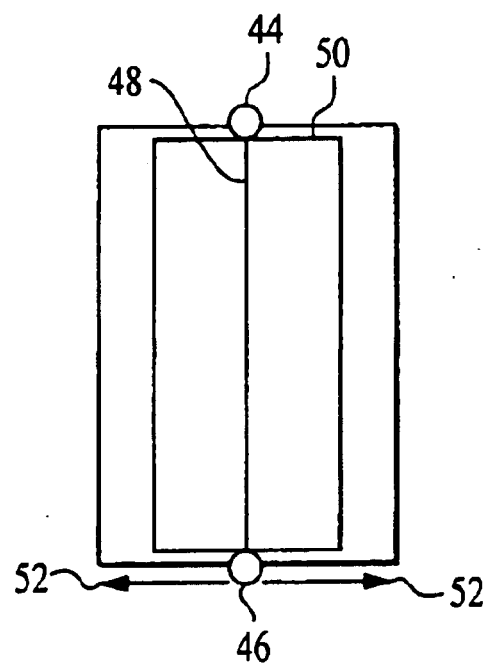
FIG. 8 is a top view of a bone projection showing creation of a shape around the projection.

By way of example, referring to FIG. 8, process 14 may grow a quadrilateral 50 over projection 48 of bone 34. More specifically, using projection 48 as the medial axis, process 14 projects vectors 52 outward from projection 48. The vectors, when connected, create a polygon that bounds the projection. The size and shape of that polygon are dictated by the size and shape of the projection and the data received during pre-processing phase 16. For example, if a larger shadow is desired, vectors 52 will be longer, resulting in a larger shape than if a smaller shadow is desired.

Process 14 maps (305b) one or more textures onto the shape (e.g., quadrilateral 50) that was created over projection 48. The texture(s) may define a color of the shape as well as how transparent or translucent the shadow is. That is, it may be desirable to see objects covered by the shadow. Therefore, a light color that is relatively transparent may be mapped. For example, texture with an alpha transparency value of 50% may be used for the mapping.

A "fuzzy" texture may also be mapped onto edges or other portions of the shape. In this context, a fuzzy texture is a texture that does not have sharp edges, meaning that the edges fade out from darker to lighter (hence the use of the term "fuzzy"). Fuzzy textures provide softer-looking shadows, which can be difficult to construct using other techniques.

Figure 10:
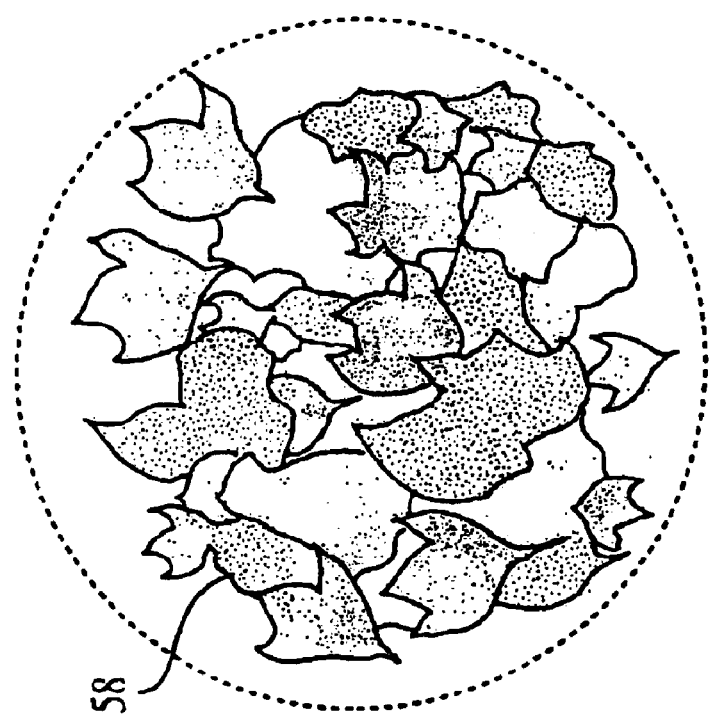
FIG. 10 is a top view of shadows of leaves in the tree.
Figure 9:
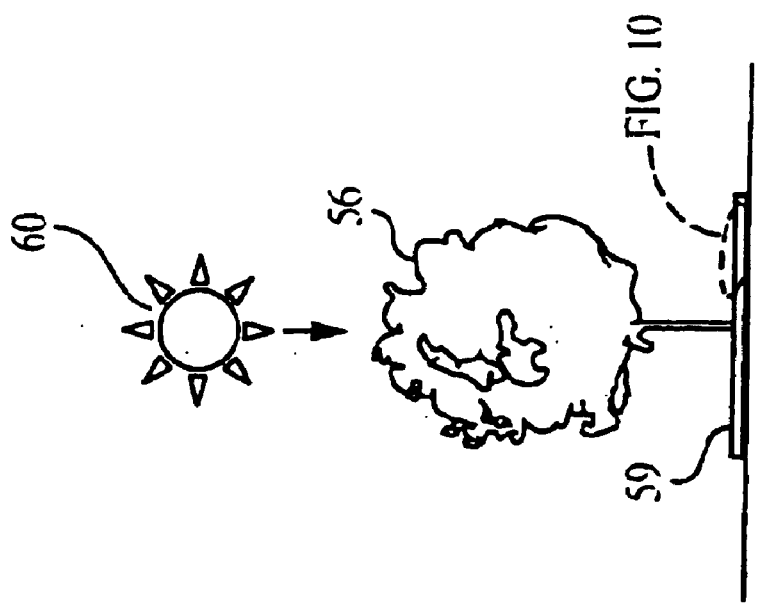
FIG. 9 is a view of a 3D model of a tree.

It is noted that process 14 may be used with other animation that does not necessarily have a bones-based infrastructure. In this case, bones may be defined for a 3D model and then process 14 may be applied. For example, bones may be defined for the veins of leaves on a tree 56 (FIG. 9). Process 14 may project shadows 58 (FIG. 10) of the leaves onto ground 59 from, e.g., a virtual sun 60 (light source).

As another example, process 14 may be used to generate a shadow of a ball (not shown). In this example, a spherical "bone" or a linear bone that points to the virtual light source (i.e., that looks like a point relative to the virtual light source) may be used to represent the ball. The bone may be projected onto a surface and a shape, such as a circle or an ellipse, may be grown from the projection. The type of shape that is grown may be defined by the user-input data or it may be determined by analyzing the shape of the bone. For example, a spherical bone may dictate a circular shape and a linear bone may dictate a rectangular shape.

Figure 11:
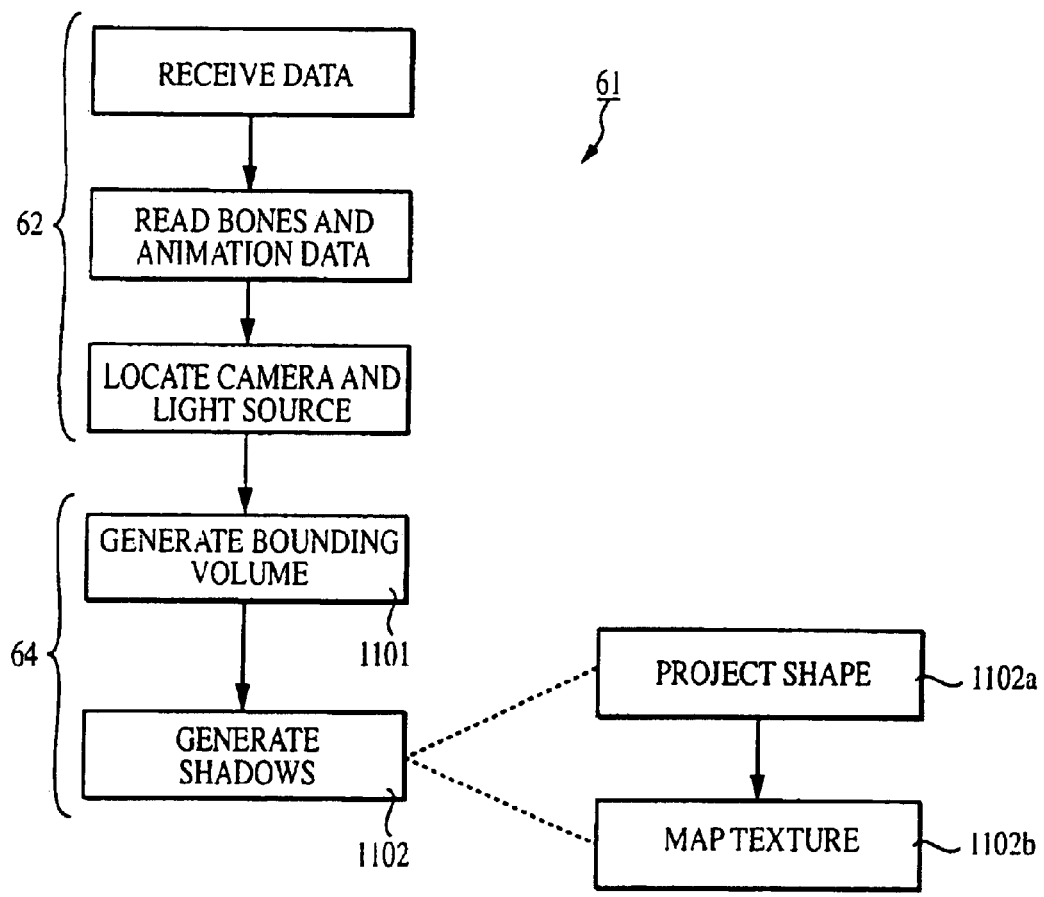
FIG. 11 is a flowchart showing another process for generating a shadow for a 3D model using bone bounding volumes.

Referring to FIG. 11, an alternative process 61 is shown for generating a shadow of a 3D model having a bones-based infrastructure. Process 61 includes a run-time phase 64 and a pre-processing phase 62 that is identical to pre-processing phase 16 of process 14. Accordingly, a description of pre-processing phase 62 for process 61 is not repeated here.

During run-time phase 64, process 61 identifies the bones infrastructure of a 3D model (e.g., 3D model 10 or 20) and, for each bone in the 3D model, proceeds as follows.

Figure 12:
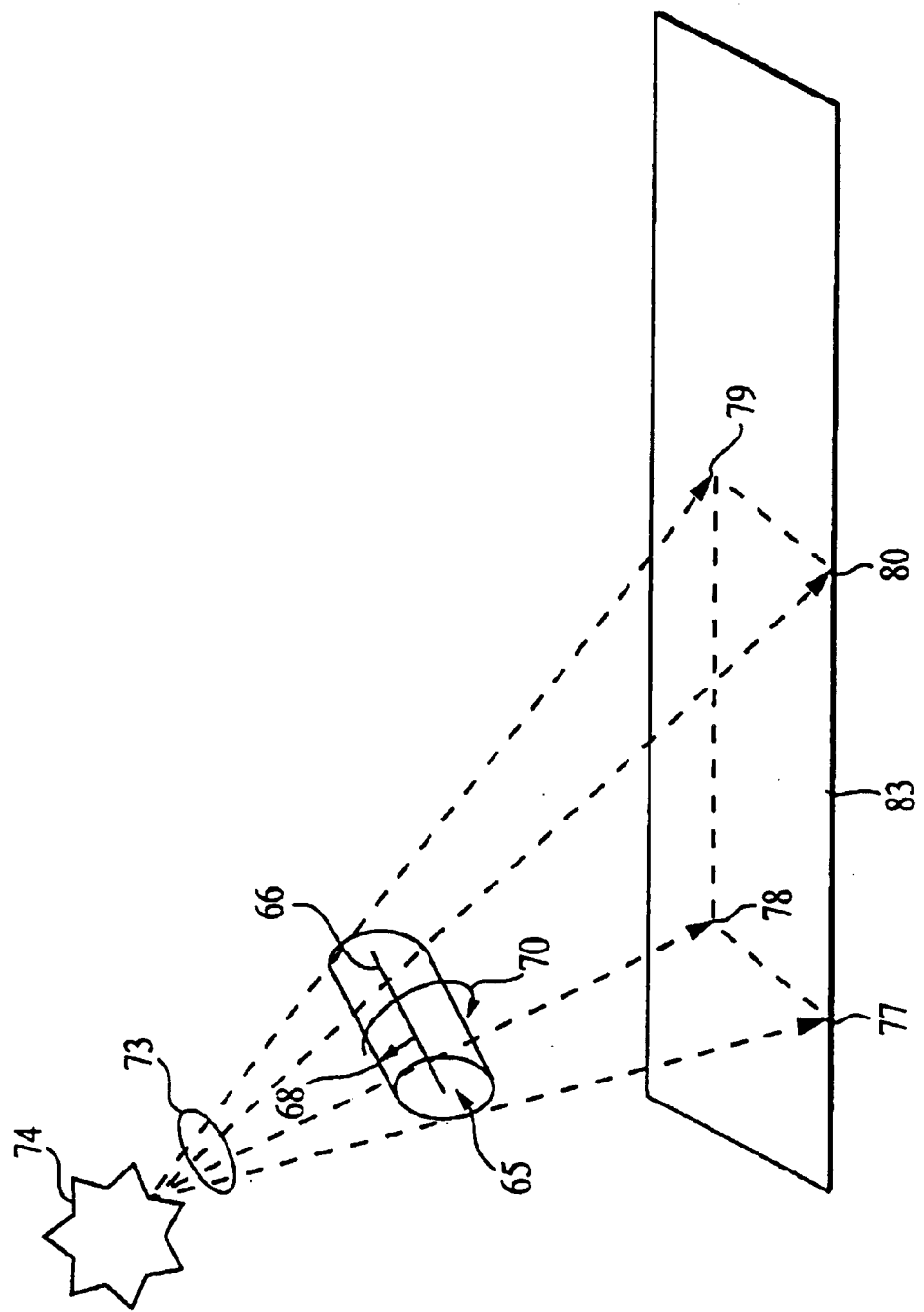
FIG. 12 is a block diagram showing projecting a bounding volume of a bone onto a surface.

Process 61 generates (1101) a bounding volume for the bone. The bounding volume of the bone is an expansion of a two-dimensional (2D) bone into 3D space. Referring to FIG. 12, the bounding volume 65 of bone 66 may be generated by projecting a vector 68 from bone 66 and rotating the vector around the bone in the direction of arrow 70. For example, the bounding volume of a vector may be a cylinder, the bounding volume of a point is a sphere, etc. The size and shape of the bounding volume may be dictated by the data received from the user. For example, if a large shadow is desired, a large bounding volume is generated.

Process 61 generates (1102) a shadow of bone 66 by projecting (1102a) a shape of bounding volume 65 onto surface 72. In more detail, process 61 draws lines (e.g., vectors) 73 from virtual light source 74, through locations on the surface (e.g., the perimeter) of bounding volume 65, onto surface 72. The number of lines drawn depends on the shape of bounding volume 65. For example, if bounding volume 65 is a cylinder (as shown), a number of lines (e.g., four) may not be required to project the shadow. On the other hand, if bounding volume 65 is a sphere, more bounding lines may be required to achieve a shadow that is a relatively close approximation of the shape of the bounding volume.

To project the shape, process 61 connects points, in this example, points 77, 78, 79 and 80 at which lines 73 intersect surface 72. Connecting the points results in a shape 83 that roughly corresponds to the outline of bounding volume 65 relative to virtual light source 74.

Process 61 maps (1102b) one or more textures onto shape 83 created by connecting the points. The texture mapping, and contingencies associated therewith, are identical to the texture mapping described above with respect to process 14.

As was the case above, process 61 may not generate a bounding volume and shadow for every bone in a 3D model. For example, process 61 may generate shadows for only "major" bones in a 3D model, where major bones may be defined, e.g., by their length or proximity to the trunk/body of a 3D model.

Figure 13:
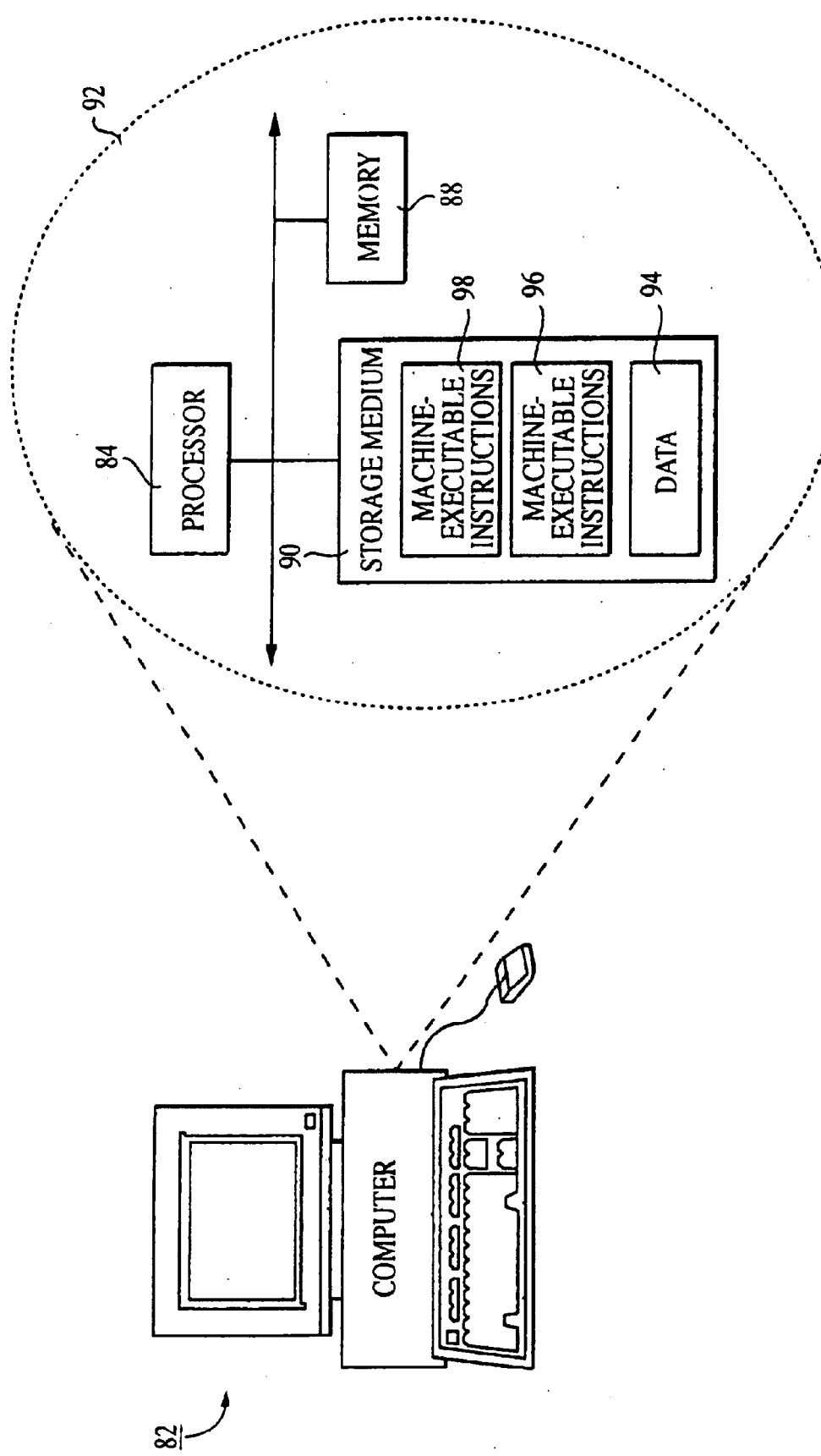
FIG. 13 is a block diagram of a computer system on which the processes of FIGS. 3 and/or 11 may be executed.

FIG. 13 shows a computer 82 for generating shadows of 3D models using processes 14 or 61. Computer 82 includes a processor 84, a memory 88, and a storage medium 90 (e.g., a hard disk) (see view 92). Storage medium 90 stores 3D data 94, which defines a 3D model, and machine-executable instructions 96 and 98, which are executed by processor 84 out of memory 88 to perform processes 14 and/or 61 on 3D data 94.

Processes 14 and 61 both have the advantage of using existing data, e.g., bones, to generate a shadow using relatively little computational effort. Moreover, processes 14 and 61 also give the user control over the look and feel of the resulting shadow.

Processes 14 and 61, however, are not limited to use with the hardware and software of FIG. 13; they may find applicability in any computing or processing environment.

Processes 14 and 61 may be implemented in hardware, software, or a combination of the two. Processes 14 and 61 may be implemented in computer programs executing on programmable machines that each includes a processor, a storage medium readable by the processor (including volatile and non-volatile memory and/or storage elements), at least one input device, and one or more output devices. Program code may be applied to data entered using an input device, such as a mouse or a keyboard, to perform processes 14 and 61 and to generate output information.

Each such program may be implemented in a high level procedural or object-oriented programming language to communicate with a computer system. However, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform processes 14 and 61. Processes 14 and 61 may be implemented as articles of manufacture, such as a machine-readable storage medium, configured with a computer program, where, upon execution, instructions in the computer program cause the machine to operate in accordance with processes 14 and 61.

The invention is not limited to the embodiments described above. For example, elements of processes 14 and 61 may be combined to form a new process not specifically described herein. The blocks shown in FIGS. 3 and 11 may be reordered to achieve the same results as described above.

Other embodiments not described herein are also within the scope of the following claims.

What is claimed is:

1. A computer-implemented method of generating a shadow for a three-dimensional model having an infrastructure that includes a virtual bone, the method comprising:

projecting the virtual bone onto a surface; and generating the shadow on the surface based on a projection of the virtual bone, wherein the shadow comprises a shape that is formed on the projection of the virtual bone, and wherein generating comprises forming the shape by distorting at least part of the projection of the virtual bone.

2. The method of claim 1, further comprising locating a virtual light source in an environment that the three-dimensional model inhabits;

wherein projecting the virtual bone comprises:

drawing lines from the virtual light source, through points on the virtual bone, onto the surface; and connecting points at which the lines intersect the surface.

3. The method of claim 1, wherein generating the shadow further comprises:

mapping texture onto the shape.

4. The method of claim 3, wherein forming the shape comprises obtaining a polygon from the projection of the virtual bone.

5. The method of claim 3, wherein mapping texture onto the shape comprises mapping a fuzzy texture onto edges of the shape.

6. The method of claim 1, further comprising receiving data that corresponds to a size and shape of the shadow;

wherein the shadow is generated based on the data.

7. A computer-implemented method of generating a shadow for a three-dimensional model having an infrastructure that includes a virtual bone, the method comprising:

generating a bounding volume for the virtual bone, the bounding volume having a shape that substantially corresponds to a shape of the virtual bone, wherein generating the bounding volume comprises expanding the virtual bone in three-dimensional space; and generating the shadow by projecting a shape of the bounding volume onto a surface.

8. The method of claim 7, further comprising locating a virtual light source in an environment that the three-dimensional model inhabits;

wherein projecting the shape comprises:

drawing lines from the virtual light source, through locations on a surface of the bounding volume, onto the surface; and connecting points at which the lines intersect the surface.

9. The method of claim 7, wherein generating the shadow further comprises mapping a texture onto the shape of the bounding volume projected onto the surface.

10. The method of claim 7, further comprising receiving data that corresponds to a size and shape of the shadow;

wherein the shadow is generated based on the data.

11. An article comprising a machine-readable medium that stores executable instructions to generate a shadow for a three-dimensional model having an infrastructure that includes a virtual bone, the instructions causing a machine to:

project the virtual bone onto a surface; and generate the shadow on the surface based on a projection of the virtual bone, wherein the shadow comprises a shape that is formed on the projection of the virtual bone, and wherein generating comprises forming the shape by distorting at least part of the projection of the virtual bone.

12. The article of claim 11, further comprising instructions to locate a virtual light source in an environment that the three-dimensional model inhabits;

wherein projecting the virtual bone comprises:

drawing lines from the virtual light source, through points on the virtual bone, onto the surface; and connecting points at which the lines intersect the surface.

13. The article of claim 11, wherein generating the shadow comprises:

mapping texture onto the shape.

14. The article of claim 13, wherein forming the shape comprises obtaining a polygon from the projection of the virtual bone.

15. The article of claim 13, wherein mapping texture onto the shape comprises mapping a fuzzy texture onto edges of the shape.

16. The article of claim 11, further comprising instructions to receive data that corresponds to a size and shape of the shadow;

wherein the shadow is generated based on the data.

17. An article comprising a machine-readable medium to generate a shadow for a three-dimensional model having an infrastructure that includes a virtual bone, the instructions causing a machine to:

generate a bounding volume for the virtual bone; and generate the shadow by projecting a shape of the bounding volume onto a surface, the bounding volume having a shape that substantially corresponds to a shape of the virtual bone, wherein generating the bounding volume comprises expanding the virtual bone in three-dimensional space.

18. The article of claim 17, further comprising instructions to locate a virtual light source in an environment that the three-dimensional model inhabits;

wherein projecting the shape comprises:

drawing lines from the virtual light source, through locations on a surface of the bounding volume, onto the surface; and connecting points at which the lines intersect the surface.

19. The article of claim 17, wherein generating the shadow further comprises mapping a texture onto the shape of the bounding volume projected onto the surface.

20. The article of claim 17, further comprising instructions to receive data that corresponds to a size and shape of the shadow;

wherein the shadow is generated based on the data.

21. An apparatus for generating a shadow for a three-dimensional model having an infrastructure that includes a virtual bone, the apparatus comprising:

a memory that stores executable instructions; and a processor that executes the instructions to:

project the virtual bone onto a surface; and generate the shadow on the surface based on a projection of the virtual bone, wherein the shadow comprises a shape that is formed on the projection of the virtual bone, and wherein generating comprises forming the shape by distorting at least part of the projection of the virtual bone.

22. The apparatus of claim 21, wherein the processor executes instructions to locate a virtual light source in an environment that the three-dimensional model inhabits; and wherein projecting the bone comprises:
  drawing lines from the virtual light source, through points on the virtual bone, onto the surface; and
  connecting points at which the lines intersect the surface.

23. The apparatus of claim 21, wherein generating the shadow comprises:

mapping texture onto the shape.

24. The apparatus of claim 23, wherein forming the shape comprises obtaining a polygon from the projection of the virtual bone.

25. The apparatus of claim 23, wherein mapping texture onto the shape comprises mapping a fuzzy texture onto edges of the shape.

26. The apparatus of claim 21, wherein:

the processor executes instructions to receive data that corresponds to a size and shape of the shadow; and the shadow is generated based on the data.

27. An apparatus for generating a shadow for a three-dimensional model having an infrastructure that includes a virtual bone, the apparatus comprising:

a memory that stores executable instructions; and a processor that executes the instructions to:

generate a bounding volume for the virtual bone, the bounding volume having a shape that substantially corresponds to a shape of the virtual bone, wherein generating the bounding volume comprises expanding the virtual bone in three-dimensional space; and generate the shadow by projecting a shape of the bounding volume onto a surface.

28. The apparatus of claim 27, wherein the processor executes instructions to locate a virtual light source in an environment that the three-dimensional model inhabits; and wherein projecting the shape comprises:

drawing lines from the virtual light source, through locations on a surface of the bounding volume, onto the surface; and connecting points at which the lines intersect the surface.

29. The apparatus of claim 27, wherein generating the shadow further comprises mapping a texture onto the shape of the bounding volume projected onto the surface.

30. The apparatus of claim 27, wherein the processor executes instructions to receive data that corresponds to a size and shape of the shadow; and the shadow is generated based on the data.

* * * * *

UNITED STATES PATENT AND TRADEMARK OFFICE
CERTIFICATE OF CORRECTION

PATENT NO. : 6,906,724 B2
DATED : June 14, 2005
INVENTOR(S) : Carl S. Marshall and Adam T. Lake It is certified that error appears in the above-identified patent and that said Letters Patent is hereby corrected as shown below:

<u>Title page,</u>
Item [73], should read as follows:
-- Assignee: Intel Corporation, Santa Clara, CA (US) --.

Signed and Sealed this

Fourth Day of October, 2005

JON W. DUDAS
*Director of the United States Patent and Trademark Office*